US011654598B2

(12) United States Patent
Avermeyer et al.

(10) Patent No.: US 11,654,598 B2
(45) Date of Patent: May 23, 2023

(54) METHOD FOR CHANGING THE MATERIAL IN AN EXTRUSION DEVICE

(71) Applicant: Windmöller & Hölscher KG, Lengerich (DE)

(72) Inventors: Ansgar Avermeyer, Georgsmarienhütte (DE); Tobias Kulgemeyer, Hagen a. T. W. (DE); Markus Bussmann, Essen (DE); Jens Minnerup, Emsdetten (DE); Martin Backmann, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 403 days.

(21) Appl. No.: 15/832,592

(22) Filed: Dec. 5, 2017

(65) Prior Publication Data

US 2018/0093395 A1 Apr. 5, 2018

Related U.S. Application Data

(63) Continuation of application No. PCT/EP2016/060447, filed on May 10, 2016.

(30) Foreign Application Priority Data

Jun. 8, 2015 (DE) ..................... 10 2015 108 978.5

(51) Int. Cl.
*B29B 7/60* (2006.01)
*B29C 48/92* (2019.01)
(Continued)

(52) U.S. Cl.
CPC .............. *B29B 7/603* (2013.01); *B29C 48/08* (2019.02); *B29C 48/10* (2019.02);
(Continued)

(58) Field of Classification Search
CPC ......... B29B 7/603; B29C 48/08; B29C 48/10; B29C 48/18; B29C 48/2692;
(Continued)

(56) References Cited

U.S. PATENT DOCUMENTS 4,336,012 A * 6/1982 Koch ...................... B29C 48/30
425/131.1
4,955,550 A * 9/1990 Satake .................... B29B 7/244
241/101.4
(Continued)

FOREIGN PATENT DOCUMENTS

DE 102013100812 7/2014
EP 0277111 8/1988
(Continued)

OTHER PUBLICATIONS

Machine translation of EP 10 2013 100 812, Jul. 7, 2014. (Year: 2014).*
(Continued)

*Primary Examiner* — Xiao S Zhao
*Assistant Examiner* — Joseph S Leyson
(74) *Attorney, Agent, or Firm* — Levine Bagade Han LLP (57) ABSTRACT

The present invention relates to a method for changing material in an extrusion device comprising at least two supply devices for supplying feedstock for an extruder, comprising the following steps:
  identifying a change request for changing the material in the extrusion device,
  preparing the supply devices for changing the material,
  separating at least two supply devices from the feed of feedstock to the extruder,
  discharging feedstock from the separated supply devices,
  filling subsequent material into the empty supply devices.

8 Claims, 7 Drawing Sheets

(51) Int. Cl.
*B29C 48/27* (2019.01)
*B29C 48/285* (2019.01)
*B29C 48/08* (2019.01)
*B29C 48/10* (2019.01)
*B29C 48/25* (2019.01)

(52) U.S. Cl.
CPC ........ *B29C 48/2692* (2019.02); *B29C 48/271* (2019.02); *B29C 48/286* (2019.02); *B29C 48/288* (2019.02); *B29C 48/92* (2019.02); *B29C 2948/9298* (2019.02); *B29C 2948/92333* (2019.02)

(58) Field of Classification Search
CPC ... B29C 48/271; B29C 48/286; B29C 48/288; B29C 48/49; B29C 48/92; B29C 2948/92333; B29C 2948/9298
See application file for complete search history.

(56) References Cited

U.S. PATENT DOCUMENTS

| | | | | |
|---|---|---|---|---|
| 4,983,090 | A | * 1/1991 | Lehmann | B29B 7/603 414/326 |
| 5,725,814 | A | 3/1998 | Harris | |
| 2012/0204999 | A1 | * 8/2012 | Bauer | B65G 69/183 141/192 |
| 2015/0367553 | A1 | 12/2015 | Backmann et al. | |

FOREIGN PATENT DOCUMENTS

| | | |
|---|---|---|
| EP | 0318170 | 5/1989 |
| EP | 0394869 | 10/1990 |
| JP | 1982178734 | 11/1982 |
| JP | 1995024899 | 1/1995 |
| WO | WO 2014/114375 | 7/2014 |

OTHER PUBLICATIONS

German Patent Application No. 2015 108 978.5 filed Jun. 8, 2015 in the name of Windmöller & Hölscher KG, Office Action dated May 16, 2017.
PCT International Patent Application No. PCT/EP2016/060447 filed Dec. 5, 2017 in the name of Windmöller & Hölscher KG, International Search Report and Written Opinion dated Aug. 30, 2016.
PCT International Patent Application No. PCT/EP2016/060447 filed Dec. 5, 2017 in the name of Windmöller & Hölscher KG, International Preliminary Report on Patentability dated Aug. 10, 2017.
Chinese Patent Application No. 201680031277.8 filed May 10, 2016 in the name of Windmöller & Hölscher KG, Office Action dated Jan. 17, 2020.
Li, Z. et al. *Advanced Manufacturing Technology*, pp. 170-171, Aug. 31, 2012, Beijing Institute Technology Publishing House.
Tang, S., *Modern Enterprise Management*, p. 293, Aug. 31, 2007, Nanjing University Press.
Song, J. et al. *Logistics Strategy and Planning*, p. 248, Sep. 30, 2006, South China University of Technology Press.

* cited by examiner

METHOD FOR CHANGING THE MATERIAL IN AN EXTRUSION DEVICE

CROSS REFERENCE TO RELATED APPLICATIONS

This application is a continuation of PCT International Patent Application No. PCT/EP2016/060447 filed May 10, 2016, which claims benefit of priority to German Patent Application No. 2015 108 978.5 filed Jun. 8, 2015, the contents of which are incorporated herein in its entirety by reference.

DESCRIPTION

The present invention relates to a method for changing a material in an extrusion device comprising at least two supply devices.

It is known that extrusion devices are used to produce plastic films or other film products. For this purpose, a formula of different feedstock is melted and mixed in the extrusion devices and is provided in liquid form to a corresponding injection head or extrusion head. To be able to change between different plastic film types, thus different products, it is necessary to change the material. This means that a feedstock needs to at least partially be removed from different supply devices of the extrusion device, in order to replace it with a subsequent material of a different composition or of different material properties. Typically, the material is changed manually.

It is a disadvantage of the known solutions that the manual changing of the material is associated with a large expenditure of time. It is thus necessary for a machine operator to operate sequentially from supply device to supply device, and to always discharge the corresponding feedstock from a supply device in order to subsequently introduce subsequent material into this empty supply device. This results in a very large expenditure of time in order to bring all supply devices of one or even of a plurality of extrusion devices from a feedstock or an application formula, respectively, to a subsequent formula.

It is the object of the present invention to at least partially eliminate the above-described disadvantages. It is in particular the object of the present invention to accelerate the changing of the material in a cost-efficient and simple manner.

The above object is solved by means of a method comprising the features of the claimed invention. Further features and details of the invention follow from the dependent claims, the description and the drawings. It goes without saying that features and details, which are described in connection with the method according to the invention according to the main claim, shall thereby also apply in connection with the method according to the invention according to the dependent claims and in each case vice versa, so that, with regard to the disclosure, reference is or can mutually always be made, respectively, to the individual invention aspects.

According to the invention, a method is proposed for changing material in an extrusion device comprising at least two supply devices. The supply devices serve to supply feedstock for an extruder. A method according to the invention comprises the following steps:

identifying a change request for changing material in the extrusion device,
preparing the supply device for changing the material,
separating at least two supply devices from the feed of feedstock to the extruder,
discharging feedstock from the separated supply devices,
filling subsequent material into the empty supply devices.

A method according to the invention is thus on principle also based on a material change for the individual supply devices, which is carried out at least partially manually. In contrast to the known solutions, however, now a parallel operation is provided. According to the invention, the material is thus now changed simultaneously in the case of at least two supply devices, simultaneously in particular in the case of a plurality of supply devices. As a result, at least two supply devices are separated from the feeding of feedstock to the extruder at the same time, so that these two or also the plurality of supply devices can be processed in parallel from a time perspective with regard to changing the material. Due to the fact that in particular the discharging of the feedstock from the separated supply devices is associated with a relatively large amount of time, large amounts of time can be gained in this way by operating in parallel. For example, it is thus possible for the machine operator to simultaneously separate two or more supply devices from the feed to the extruder and now opens discharge openings of the individual supply devices sequentially one after the other. The feedstock can now run out of these open discharge openings out of all open supply devices, in particular by gravity conveyance, and can be collected in corresponding discharge containers. The discharge thereby occurs substantially completely independently, without the need for the machine operator to thereby stand next to the system or next to this explicit supply device, respectively. This thus has the result that the discharge process of the feedstock can take place in parallel from two or more supply devices. Due to the fact that the discharge of the feedstock oftentimes represents one of the largest time components for changing the material in the case of large quantities of feedstock in the supply devices, such a parallelization is associated with a very large time advantage for changing the material. The time for changing the material can thereby in particular be reduced to a minimum of approximately 10% of the otherwise usual time, which is required for changing the material.

The step of preparing the supply device for changing the material can thereby be designed in a large variety of ways. In particular, this represents an impacting of the filling level of the respective supply device, in particular with regard to a reduction of the filling level. This will be discussed in more detail below. As soon as the feedstock is discharged, a partial refilling with subsequent material can already take place at this point in time in the case of corresponding embodiments of the supply devices. Supply devices can thus in particular be constructed in three parts, comprising a weighing funnel, a down pipe arranged thereabove, and a feed container, which, in turn, is arranged above the down pipe. In the case of such an embodiment, the feed container is then typically closed by means of a corresponding flap, so as to be able to carry out a refilling in the feed container independently of the components, which are arranged therebelow. In other words, subsequent material can be refilled into the feed container as soon as the feed container is free from feedstock, while feedstock is at the same time still in the process of being discharged below the feed container. This makes it possible to provide an even further parallelization of the individual steps for changing the material, so that the time savings comes to light even more clearly in this way. A further advantage, which can be attained in addition to the time savings, by means of operating in parallel, is a reduction of the risk that the extruder drains. It is thus ensured that material is fed very quickly to the extruder again, in particular by filling subsequent material into a feed container at a particularly early point in time, in an emergency situation, which includes the risk that the extruder drains. A draining of the extruder represents one of the most difficult situations, because a cleaning of the extruder, which is still hot, but which has drained, needs to be carried out in a highly elaborate manner in such a case. Even irreversible damages to an extruder are in particular possible in this way, if said extruder is no longer loaded with feedstock or subsequent material, but is still at operating temperature.

It may be advantageous, when, with a method according to the invention, the filling level of the supply devices is reduced to a changing filling level to prepare said supply devices. This is to be understood in such a way that an operating filling level typically represents the largest possible buffer effect for the normal operation within the supply device. A supply device and the components included therein can thus in particular be filled substantially completely with feedstock, as long as it is the normal operating situation. If a preparatory measure is now desired, the filling level of this operating filling level is now within the context of a method according to the invention preferably lowered to a changing filling level, which is embodied accordingly lower than the operating filling level. As a result, significantly less feedstock is present in this corresponding supply device at the time the material is changed, thus for discharging the feedstock from the respective supply device. This is in particular associated with two significant advantages. On the one hand, the volume and thus the total quantity of feedstock, which needs to be discharged, is significantly lower, so that less waste is created. The quantity of feedstock, which needs to be discharged, is furthermore directly proportional to the time, which is required for this discharge process of the feedstock. The reduction of the filling level within the supply device to the changing filling level thus has the result that less feedstock needs to be discharged from the supply device and accordingly also with less time. In addition to the already-mentioned parallelization of the individual discharge steps by simultaneously processing two or more supply devices, an additional time reduction for changing the material can be attained in this way, because the time required for the actual discharging of the respective supply device can be reduced as well. The reduction to the changing filling level can thereby be embodied so as to be capable of being activated automatically as well as in a manual manner. It goes without saying that a further filling level reduction to a so-called minimal filling level can take place as well, which is still below the changing filling level. It is important to note thereby that it goes without saying that the buffer effect of the residual material of feedstock is reduced in the respective supply device by reducing the filling level. Due to the fact, however, that a machine operator is typically always located directly next to the respective extrusion device at the time the material is changed, this reduction of the buffer effect can be accepted, because a quick reaction speed is at hand due to a quick identification speed of the machine operator with regard to problems at the extrusion device.

It is a further advantage when, with a method according to the invention, a discharge container is cleaned to prepare the supply devices and when it is fastened to a container interface of the respective supply device. Such a discharge container thus serves to accommodate the discharged feedstock. In the alternative or in addition, it is also conceivable that a return hose, which returns the discharged feedstock into a storage device, for example a silo, instead of the discharge container, is fastened to a corresponding container interface. It goes without saying that the preparation of the corresponding discharge container or of a return hose, respectively, can also be provided directly after the respective change, so that the discharge container or the return hose, respectively, is already present in the receptive position and embodiment for the coming change. After discharging feedstock into a discharge container, the latter can thus for example be emptied directly following the change of the material. The discharge container, which is now empty, is fastened to the container interface of the respective supply device again and is thus now ready for changing the material, which is to be carried out subsequently. This step of preparing makes it possible to preferably completely automate other steps for changing the material, in particular the opening of a discharge opening or the corresponding discharge of the feedstock, respectively. The onset of changing the material after identifying an end of a production period of a plastic film can thus in particular even be started automatically by means of this solution of a method according to the invention. This is in particular preferred when a plurality of production systems are to be overseen in parallel by a single machine operator, so that changing the material all the way to the production capability can thus be carried out in a substantially fully-automatic manner with a subsequent formula for the critical situation of changing the material. It goes without saying that it is possible thereby that the actual situation is verified via corresponding sensors for such an automated procedure. The presence of the discharge container as well as the type and embodiment of the discharge container can thus be identified via such a sensor system. It is also possible that the cleaning of the discharge container or the empty embodiment thereof, respectively, can be identified in this way.

It may further be advantageous when, with a method according to the invention, the steps of identifying, of preparing, of separating, of discharging and/or of filling in are carried out automatically, based on a manual or an automatic activation. This is to be understood such that, as has already been discussed in the above paragraph, at least parts of the material change are carried out in an automated manner. This refers in particular to the steps for changing the material, which have the result that feedstock has been replaced by the subsequent material to the extent that the subsequent material can now be fed to the extruder again via the supply devices. As a result, a substantially complete automatism can run at the time the material is changed, and the machine operator accordingly only needs to only finish changing the material. This finishing preferably has no impact on the production with the subsequent formula or with the subsequent materials, respectively, from the respective supply device. This makes it possible to provide for a monitoring, control, triggering or also inspection of the method, which runs automatically, at a display device, for example with the help of push buttons.

It is a further advantage when, with a method according to the invention, the steps are carried out in a production machine comprising at least two extrusion devices, wherein each extrusion device produces one layer of the plastic film. It is preferred, when the steps are carried out in a production machine comprising at least three extrusion devices. It is particularly preferred, when the steps are carried out in a production machine comprising at least four extrusion devices. This is in particular the case, when complex plastic films are to be created, in particular in a so-called cast film process or a blown film process, respectively. The higher the complexity of the production machine, thus the more extrusion devices are used, the more complex the task of changing the material. In the case of such complex embodiments of the corresponding production machine, a method according to the invention is accordingly associated even more clearly with the advantages, as they have already been discussed.

A further advantage can be attained when, with a method according to the invention, an analysis of all feedstock and of all subsequent materials, on the basis of which a change order is output, which provides the execution order for the individual extrusion devices and/or for the individual supply devices of the extrusion devices, takes place after the identification of the change request. Such a change order can also be identified as change strategy and is in particular output in an automated or partially automated manner, respectively. Such a change order can thereby consider a large variety of features. One corresponding factor can be the production stability, which is the bubble stability of the created plastic bubble, in the case of a blown film machine. Other prioritization parameters are possible as well. For example, the speed of outputting the feedstock, in particular when using color pigments, is thus an essential component. In the case of the change strategy, it can thus for example be considered that the rinsing time experiences a reduction. Some materials can thus be rinsed more easily than other materials with regard to their viscosity. In particular feedstock, the rinsing time of which is particularly long, need to thus be processed as one of the first with regard to changing the material. As a result, time-intensive steps could be given priority by means of the automation options of a method according to the invention, so that an improved processing for changing the material is made possible, depending on the respective wish and prioritizing feature for the change strategy.

It is a further advantage when, with a method according to the invention, a cleaning step, in particular in the form of a cleaning program of a cleaning device, is carried out after the discharge of the feedstock from the separated supply devices. A manual cleaning is thereby also possible. However, in particular a cleaning device inside the supply devices is provided, which can carry out corresponding cleaning steps. Such a cleaning device can have cleaning means, for example, which carry out corresponding cleaning steps, in particular by means of air pressure nozzles. A separation thereby preferably takes place from top to bottom, after the discharge of the feedstock has taken place. As a result, undesired residual contaminations of residual granulate of feedstock can be eliminated from the respective supply device, so that the respective production can start in an even more homogenous manner. This is associated with large advantages, in particular for the beginning of a subsequent production step of a subsequent formula, because the remaining risk of a waste production can be reduced significantly in this way.

It may be a further advantage when, with a method according to the invention, the subsequent material is brought to the extrusion device, in particular in the form of a container feed, to prepare the supply device for changing the material. As an alternative thereto, silo storages or other storage devices are conceivable as well. A corresponding connection can be provided for example by means of a lance, which is inserted into a container. Transport hoses for connection to a respective silo or a storage device, respectively, are also conceivable in the case of this embodiment of the present invention.

It is a further advantage when, with a method according to the invention, the material is changed in parallel at least sectionally in terms of time for all supply devices of an extrusion device, except for a last supply device. The extruder is thus prevented from draining in a particularly effective manner, because in particular a main component, which accounts for the largest percentage of the respective application formula, with regard to the feed speed and feed volume, continues to run, while all other supply devices are processed with regard to changing the material. As a result, it is very likely that a draining of the extruder and also a tearing of a plastic film during the production process is avoided. This strategy is in particular combined with the change order, as it has already been discussed. The parallelism can also be increased even further in this way, so that the time savings comes to light even further in this way.

It is also advantageous when, with a method according to the invention, a completion signal is output after the discharge of the feedstock, which indicates the completion of the discharge to the operating personnel. This is in particular advantageous when a manual step, for example the removal of a filled discharge container, is to be carried out after the discharge. The machine operator can perceive such a completion signal in particular in a sensory manner. Visual and/or acoustic completion signals are preferred thereby. For example, LEDs can be used on lances or suction hoses, which can give a corresponding completion signal for discharging the respective supply device. It goes without saying that purely quantitative displays or also qualitative displays can be chosen thereby. A response relating to the correctness of the performed steps is in particular also conceivable in response to changing the material in the context of the present invention.

BRIEF DESCRIPTION OF THE DRAWINGS

Further advantages, features and details of the invention follow from the description below, in which exemplary embodiments of the invention are described in detail by referring to the drawings. The features mentioned in the claims and in the description can thereby be significant for the invention, in each case alone or in any combination. It is shown:

DETAILED DESCRIPTION

Figure 1:
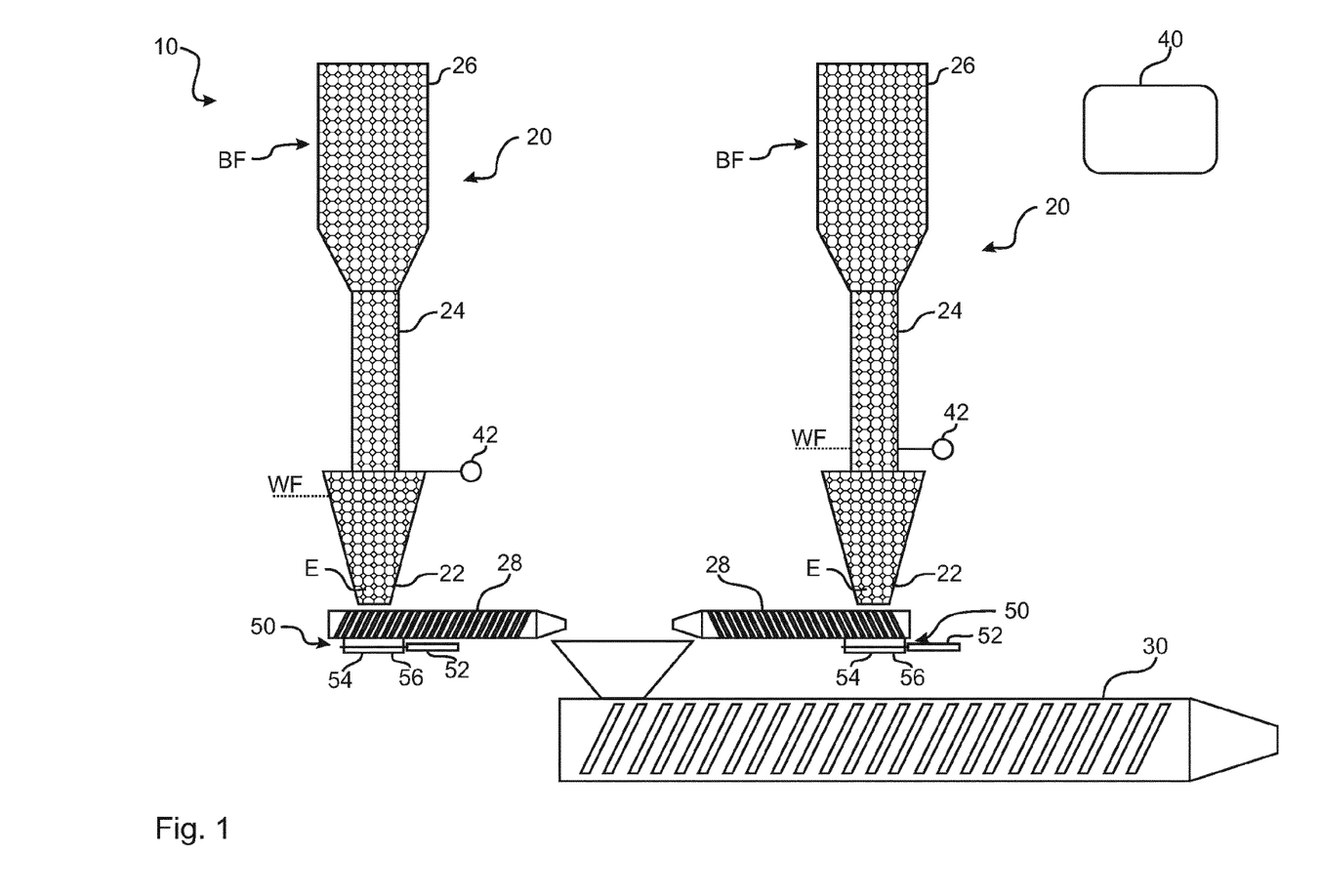
FIG. 1 a first embodiment of an extrusion device according to the invention in the operating state, FIG. 2 the embodiment of FIG. 1 during a lowering of the filling levels, FIG. 3 the embodiment of FIGS. 1 and 2 with a filling level at changing filling level, FIG. 4 the embodiments of FIGS. 1 to 3 with a fluctuating filling level, which is kept at changing filling level, FIG. 5 the embodiment of FIGS. 1 to 4 during a cleaning situation, FIG. 6 the embodiment of FIGS. 1 to 5 during the refilling with a subsequent material and FIG. 7 an alternative embodiment of an extrusion device.

FIGS. 1 to 6 illustrate an extrusion device 10 schematically, which is equipped with two supply devices 20. Each of these supply devices 20 is equipped with a feed container 26, a down pipe 24 and a weighing funnel 22. FIG. 1 shows the operating situation, wherein each supply device 20 is filled with a feedstock E up to a full operating filling level BF. In this state, the respective feedstock E is supplied to an extruder 30 via dosing screws 28 and is used for the production of the plastic film there. A method according to the invention is thereby carried out in a corresponding control device 40.

Figure 2:
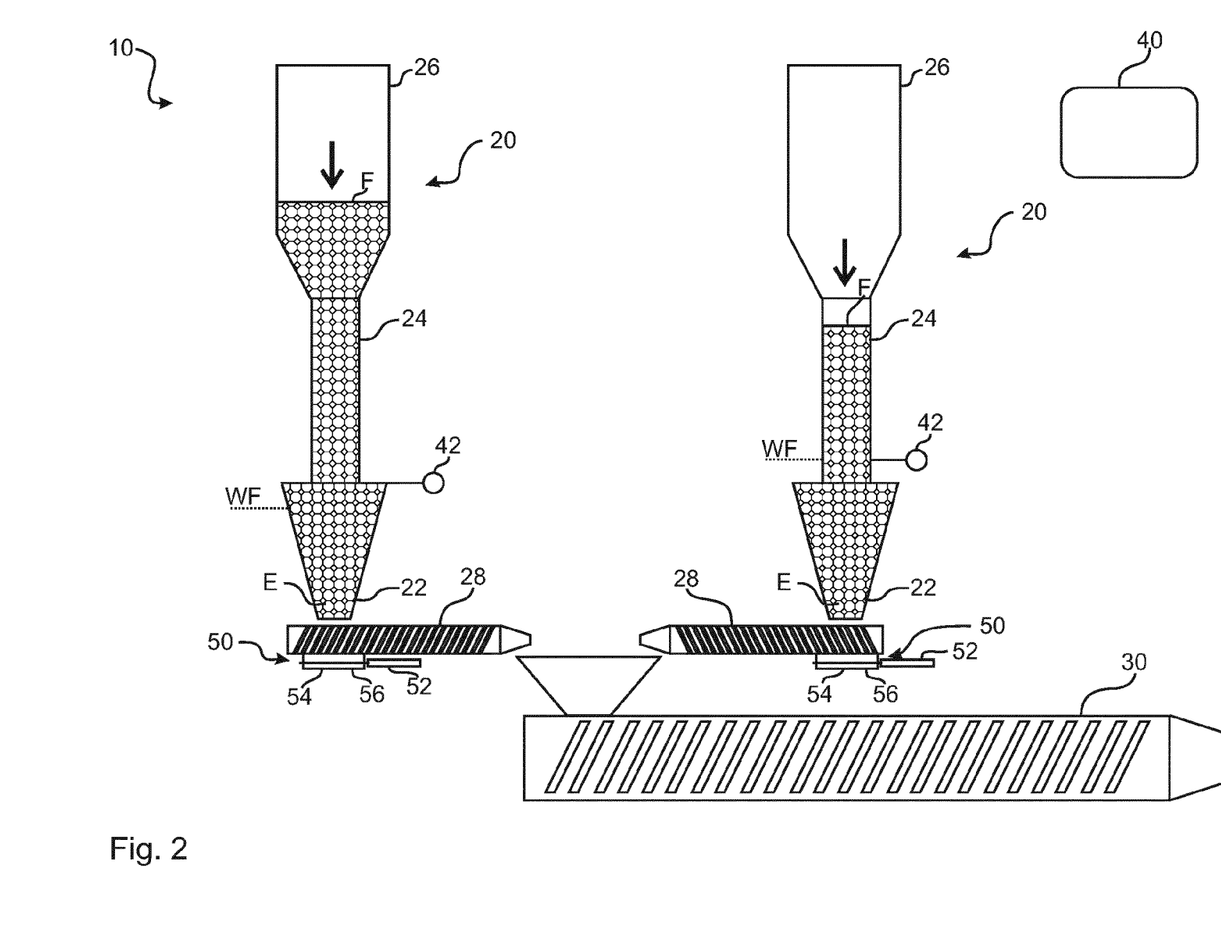
Figure 3:
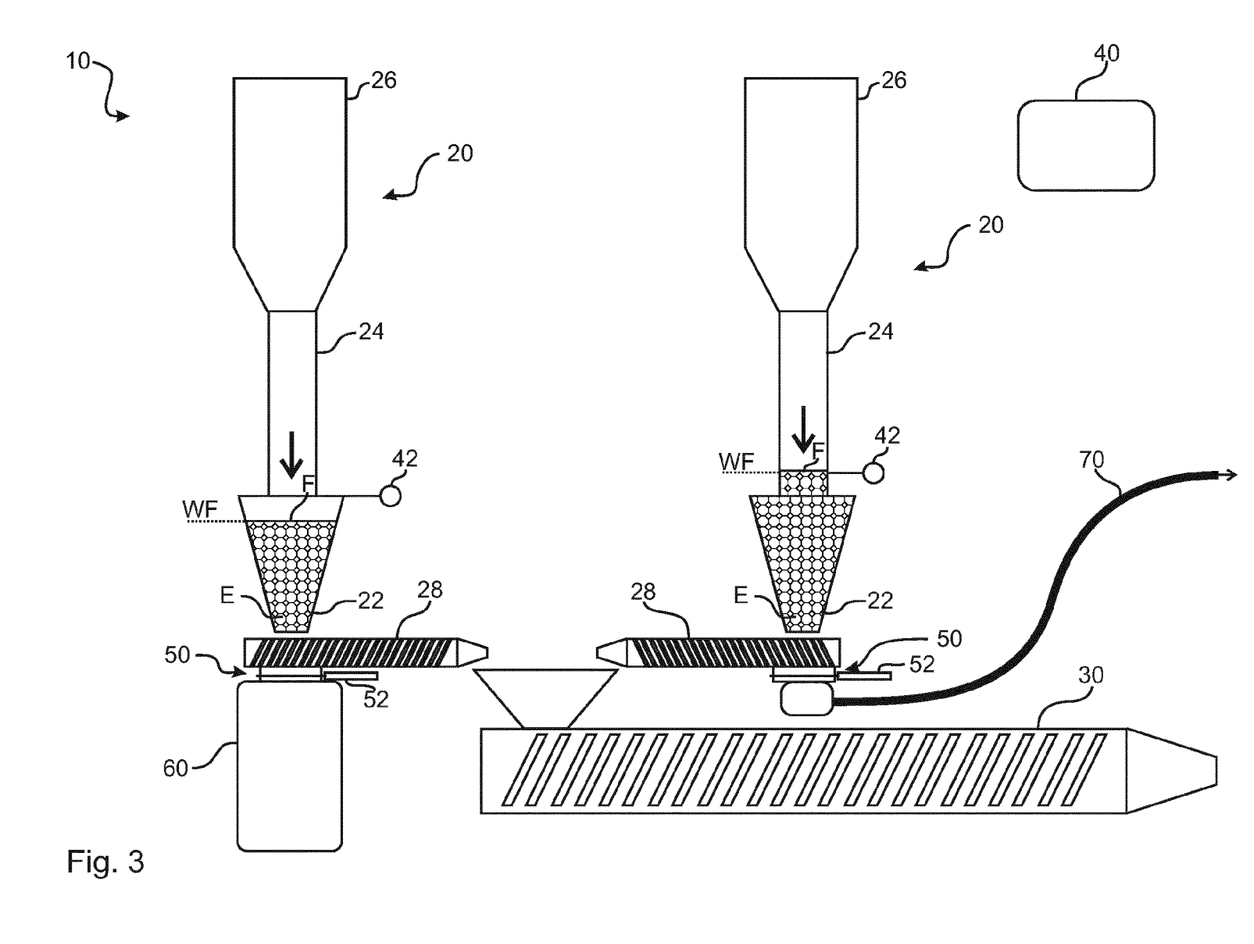
Figure 4:
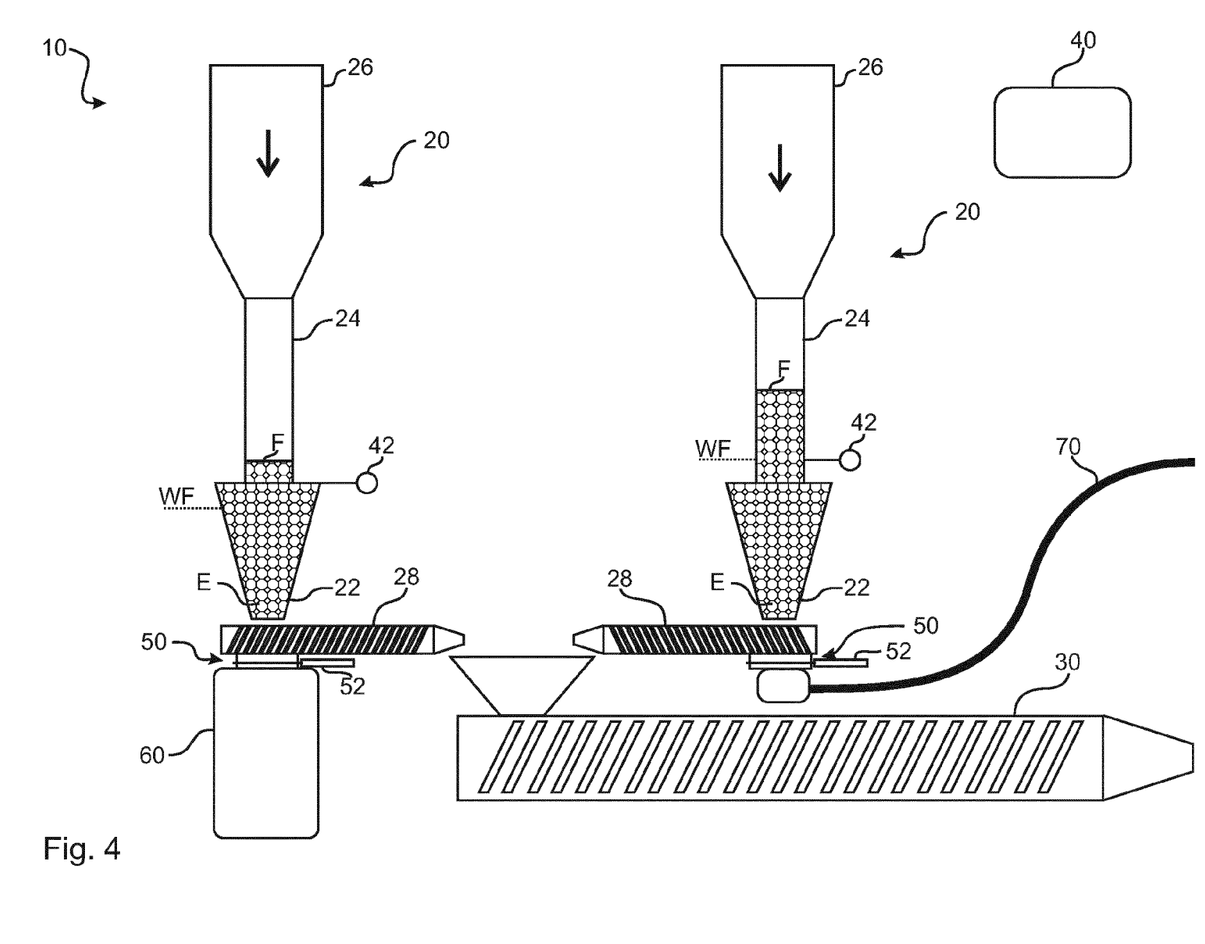

In preparation for changing the material, FIG. 2 shows how a lowering of the filling levels F of the feedstock E takes place. By further production without refilling into the supply devices 20, the filling level F now drops, until it reaches a changing filling level WF according to FIG. 3. So as not to fall below this changing filling level WF, corresponding filling level sensors 42 are provided, so that a short refilling in the form of a refilling push takes place at the point in time according to FIG. 3, so that substantially a fluctuating holding of the filling level F at the level according to FIGS. 3 and 4 takes place.

Figure 5:
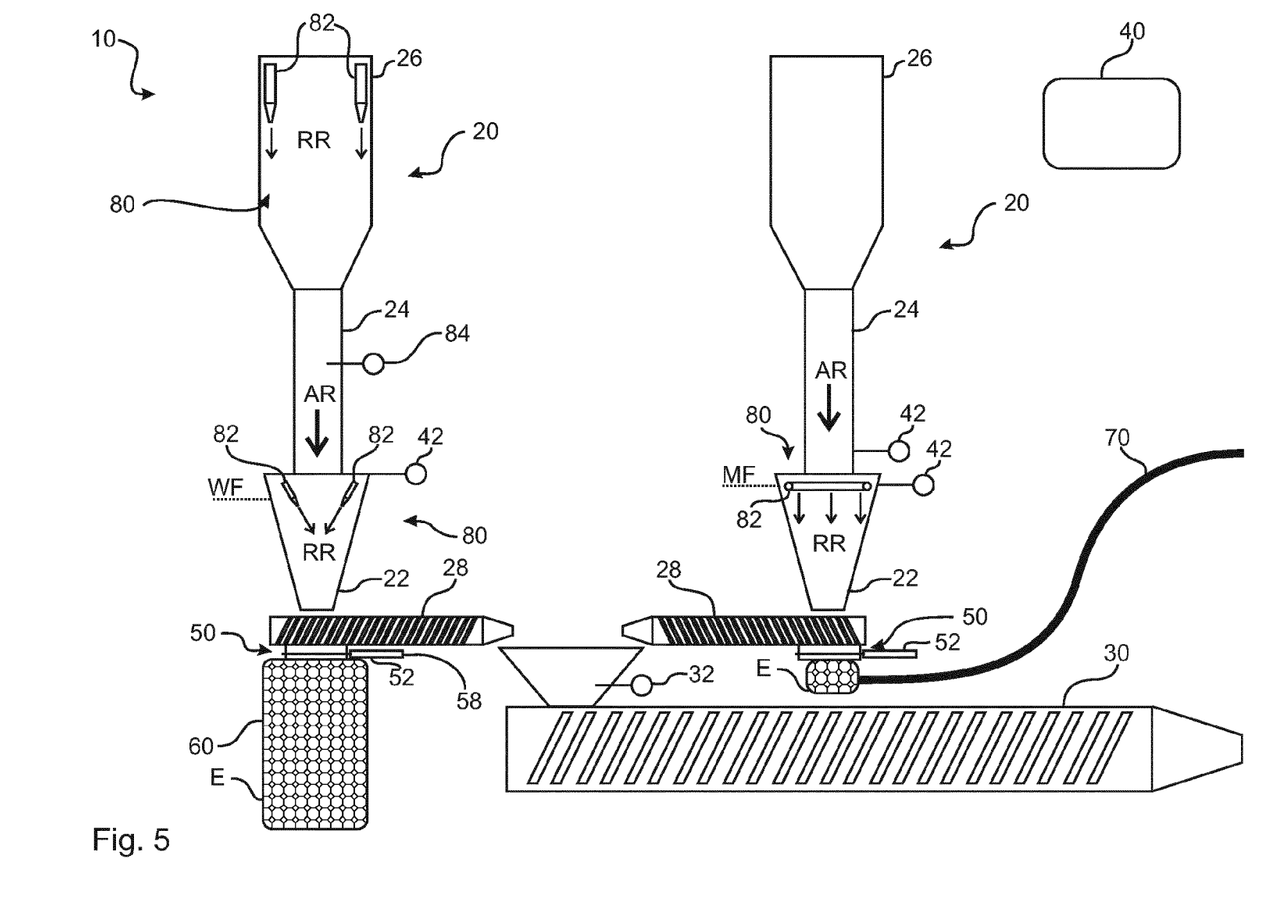

FIG. 5 shows, how the feedstock E can be completely discharged downwards from the supply devices 20 at the time of actually changing the material. The catching can occur in a discharge container 60 as well as with the help of a return device 70. For the discharging, discharge openings 50 are provided, which are closed by means of a discharge closure 52. The corresponding arrangement of the discharge containers 60 is possible via a container interface 54. Last but not least, an opening sensor 58 is provided, which can in particular be used in response to a cleaning step, which is to be carried out, with a cleaning device 80 comprising a plurality of cleaning means 82.

Figure 6:
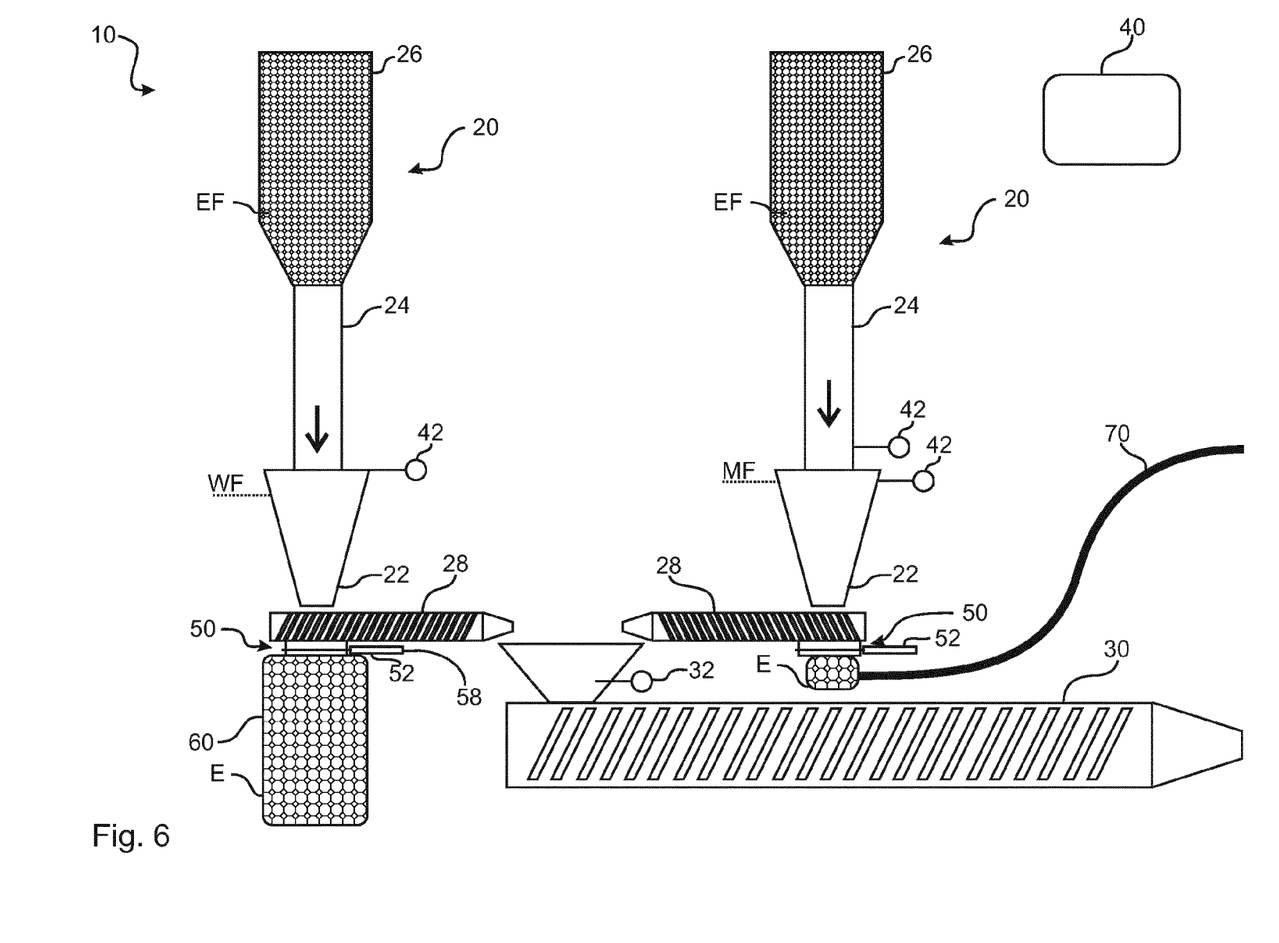

It is illustrated in FIG. 6, how a subsequent material EF can already be filled back into the feed containers 26 of the supply devices 20 at this point in time, so that the switchover between the feedstock F and the subsequent material EF can subsequently take place particularly quickly and with small mixing.

Figure 7:
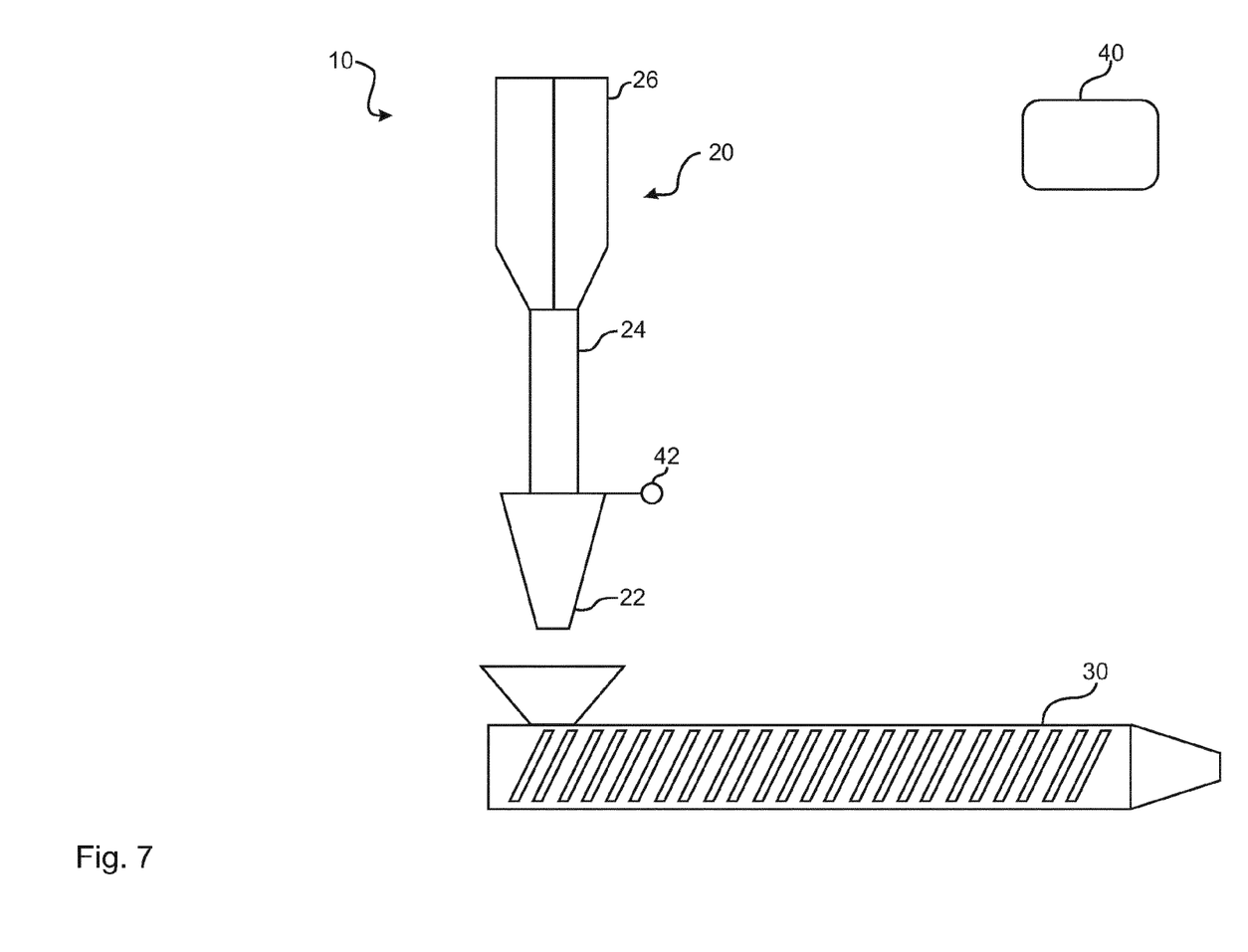

FIG. 7 shows an alternative embodiment of an extrusion device 10. With regard to the advantages described according to the invention, said extrusion device is based on the embodiment of FIG. 1, but differs in the refilling function. A so-called batch process is thus provided here for the refilling. The feed container 26 is equipped with separate volumes, so that each volume of the feed container 26 can be understood to be a supply device 20. Components in the form of the down pipe 24 and of the weighing funnel 22 arranged therebelow are thus common components of the different supply devices 20. Below the weighing funnel 22 a mixing funnel is provided, in particular comprising a mixer drive, which allows for a homogenization prior to entering the extruder.

LIST OF REFERENCE NUMERALS

10 extrusion device
20 supply device
22 weighing funnel
23 funnel opening
24 down pipe
26 feed container
28 dosing screw
30 extruder
32 emergency sensor
40 control device
42 filling level sensor
50 discharge opening
52 discharge closure
54 container interface
56 sensor device
58 opening sensor
60 discharge container
62 discharge volume
70 return device
80 cleaning device
82 cleaning means
84 dust sensor
E feedstock
EF subsequent material
BF operating filling level
WF changing filling level
F filling level
RR cleaning direction
AR discharge direction

We claim:

1. A method for changing material in at least four extrusion devices, each comprising at least two supply devices for supplying feedstock for an extruder, comprising the following steps:
    identifying a change request for changing the material in at least one of the at least four extrusion devices,
    preparing the supply devices for changing the material by lowering a filling level of the at least two supply devices of the at least one of the at least four extrusion devices, wherein the filling level is lowered to a changing filling level which is held fluctuating to not fall below the changing filling level,
    separating the at least two supply devices of the at least one of the at least four extrusion devices from a feed of feedstock to the extruder,
    discharging feedstock from the separated supply devices to empty the at least two supply devices of the at least one of the at least four extrusion devices,
    filling subsequent material into the empty supply devices, wherein a discharge container is cleaned to prepare the supply devices, wherein the discharge container is removable from the respective supply device after the discharge container is filled with discharged feedstock,
    wherein the steps are carried out in a production machine comprising the at least four extrusion devices, wherein each of the at least four extrusion devices produces one layer of a plastic film.

2. The method according to claim 1, wherein the filling level of the supply devices is reduced to a changing filling level to prepare said supply devices.

3. The method according to claim 1, wherein the discharge container is detachably fastened to a container interface of the respective supply device.

4. The method according to claim 1, wherein the steps at least of identifying, of preparing, of separating, of discharging or of filling in are carried out automatically, based on a manual or an automatic activation.

5. The method according to claim 1, wherein a cleaning step for cleaning the separated supply devices is carried out after the discharge of the feedstock from the separated supply devices.

6. The method according to claim 1, wherein the subsequent material is brought to the at least one of the at least four extrusion devices to prepare the supply devices for changing the material.

7. The method according to claim 1, wherein the material is changed in parallel at least sectionally in terms of time for all of the supply devices of the at least one of the at least four extrusion devices, except for one supply device of the supply devices of the at least one of the at least four extrusion devices.

8. The method according to claim 1, wherein a completion signal is output after the discharge of the feedstock, which indicates a completion of the discharge to operating personnel.

* * * * *